United States Patent
Kawauchi et al.

(10) Patent No.: US 8,905,559 B2
(45) Date of Patent: Dec. 9, 2014

(54) OPTICAL LENS HAVING SUB-WAVELENGTH STRUCTURE CONTAINING ALUMINUM OR ALUMINUM OXIDE, METHOD OF MANUFACTURING OPTICAL LENS, AND IMAGING OPTICAL SYSTEM INCLUDING OPTICAL LENS

(75) Inventors: Hiroshi Kawauchi, Nagareyama (JP); Masayuki Yamada, Tokyo (JP); Takeharu Okuno, Utsunomiya (JP); Ryo Ogawa, Kawasaki (JP); Tomonari Nakayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 695 days.

(21) Appl. No.: 13/006,331

(22) Filed: Jan. 13, 2011

(65) Prior Publication Data
US 2011/0176216 A1   Jul. 21, 2011

(30) Foreign Application Priority Data
Jan. 18, 2010   (JP) ................ 2010-008494

(51) Int. Cl.
G02B 27/00 (2006.01)
G02B 1/11 (2006.01)
G02B 5/00 (2006.01)
B29D 11/00 (2006.01)

(52) U.S. Cl.
CPC ............... *G02B 5/003* (2013.01); *G02B 1/118* (2013.01); *B29D 11/00903* (2013.01)

USPC ..................... 359/601; 359/614; 359/738

(58) Field of Classification Search
None
See application file for complete search history.

(56) References Cited

U.S. PATENT DOCUMENTS

| | | | |
|---|---|---|---|
| 2008/0199659 A1* | 8/2008 | Zhao | 428/161 |
| 2010/0226016 A1* | 9/2010 | Hirauchi et al. | 359/614 |
| 2013/0016430 A1* | 1/2013 | Ogawa et al. | 359/614 |

FOREIGN PATENT DOCUMENTS

| | | |
|---|---|---|
| JP | 47-32418 B | 8/1972 |
| JP | 55-155064 A | 12/1980 |
| JP | 2006-053220 A | 2/2006 |
| JP | 2007322485 A | 12/2007 |
| JP | 2008276059 A | 11/2008 |
| WO | WO 2009014264 A1 * | 1/2009 |

* cited by examiner

*Primary Examiner* — Arnel C Lavarias
(74) *Attorney, Agent, or Firm* — Canon USA Inc. IP Division

(57) ABSTRACT

An optical element includes an optically effective area and an optically ineffective area partly or entirely coated with a coating opaque at wavelengths used. The opaque coating contains a cured product prepared from an epoxy resin and a curing agent containing an alicyclic acid anhydride. The alicyclic acid anhydride is preferably methylhexahydrophthalic anhydride or hexahydrophthalic anhydride.

13 Claims, 3 Drawing Sheets

OPTICAL LENS HAVING SUB-WAVELENGTH STRUCTURE CONTAINING ALUMINUM OR ALUMINUM OXIDE, METHOD OF MANUFACTURING OPTICAL LENS, AND IMAGING OPTICAL SYSTEM INCLUDING OPTICAL LENS

BACKGROUND OF THE INVENTION

1. Field of the Invention

The present invention relates to optical elements and particularly relates to an optical element suppressing the generation of harmful light causing flares or ghosts.

2. Description of the Related Art

For optical elements such as lenses, various techniques have been proposed for the purpose of suppressing the generation of harmful light that causes flares or ghosts to obtain high-quality, high-performance optical systems. The techniques are classified into two: (1) a technique for reducing reflection by increasing the light transmittance of an optically effective area and (2) a technique for reducing reflection by increasing the light absorbance of an optically ineffective area.

The term "optically effective area" as used herein refers to an area through which light passes. The term "optically ineffective area" as used herein refers to an area through which no light passes. In the case of installing a plurality of lenses such as camera lenses in a lens barrel, although the lenses individually serve as optically effective areas, some of the lenses are likely to serve as optically ineffective areas because no light passes therethrough depending on the sizes and positions of other lenses.

As an example of the technique specified in Item (1), the following technique is widely used: a technique for providing a dielectric coating on an optically effective area by a vacuum vapor deposition process, a sputtering process, or a similar process. Known is an antireflective element using a sub-wavelength structure (SWS) not greater than a wavelength used instead of such a dielectric coating.

Japanese Patent application Laid-Open No. 2006-053220 discloses that a curved surface for forming a member has an antireflective area having periodic micro-irregularities arranged at a pitch not greater than the wavelength of a light beam to be prevented from being reflected. The antireflective area is capable of obtaining antireflection performance excellent in wavelength characteristic and incident angle characteristic as compared to conventional antireflective structures including dielectric coatings.

As an example of the technique specified in Item (2), the following technique is widely used: a technique for reducing internal reflection by forming a coating substantially opaque at wavelengths used on a side end portion (commonly called an edge portion) of a lens. The following paint is usually used to form the coating: an internal reflection-preventing paint prepared by kneading a resin component with a light-absorbing material such as coal tar, coal tar pitch, a black pigment, a black dye, or carbon black. Japanese Patent application Publication No. 47-32418 discloses that internal reflection is reduced using several dyes including a black dye in combination with pitch, carbon black, and an epoxy resin. Japanese Patent application Laid-Open No. 55-155064 discloses that a good internal reflection-reducing effect and the mechanical strength of a coating are secured using a halogenated epoxy resin in combination with coal tar and coal tar pitch.

In addition to the materials disclosed in the above-reference patent documents, epoxy resins and modified epoxy resins are widely used as resin components of internal reflection-preventing paints. This is because cured products having high strength and excellent weather resistance can be obtained using the epoxy resins in combination with appropriate curing agents depending on intended purposes. The epoxy resins are particularly appropriate for the purpose of forming coatings required to have long-term durability. Usually, an epoxy resin or a mixture of the epoxy resin and an additive for imparting a function to the epoxy resin is referred to as a base compound or a base resin with respect to a curing agent. Makers usually designate curing agents used in combination with base compounds depending on intended purposes.

In recent years, coatings have been sometimes subjected to manufacturing processes at higher temperatures as compared to conventional processes for the purpose of improving the performance of optical element. This increases the load on the coatings to negatively affect the function and appearance of the coatings during long-term use.

In the thermal analysis of a cured product of an antireflective paint prepared by mixing an epoxy resin with a black pigment, a common curing agent, and the like, the heating of the cured product to temperatures higher than those used in common manufacturing processes may cause a reduction in the weight of the cured product and may confirm an increase in the glass transition temperature (Tg) of the cured product. These phenomena suggest the cured product is degraded and is reduced in flexibility by thermal decomposition and oxidation. Thermal decomposition and oxidation possibly cause phenomena such as the formation of cracks and/or voids in actual opaque coatings and the removal of the coatings from bases of optical elements by thermal stress. Usually, these phenomena result in the whitening of appearance and the easiness of moisture penetration.

The present invention has been made against such a background and provides an optical element including an optically ineffective area partly or entirely coated with a coating which contains a cured product having improved heat resistance and flexibility and which is opaque at wavelengths used.

SUMMARY OF THE INVENTION

An optical element according to an embodiment of the present invention includes an optically effective area coated with a coating having an optical function and an optically ineffective area partly or entirely coated with a coating opaque at wavelengths used. The opaque coating contains a cured product prepared from an epoxy resin and a curing agent containing an alicyclic acid anhydride.

According to the present invention, the following element can be provided: an optical element including an optically ineffective area partly or entirely coated with a coating which contains a cured product having improved heat resistance and flexibility and which is opaque at wavelengths used.

According to the present invention, the optical element includes the optically ineffective area partly or entirely coated with the opaque coating and therefore is effective in a high-temperature process or high-temperature, high-humidity process used to form another coating on an optically effective area.

Further features of the present invention will become apparent from the following description of exemplary embodiments with reference to the attached drawings.

DESCRIPTION OF THE EMBODIMENTS

Figure 1:
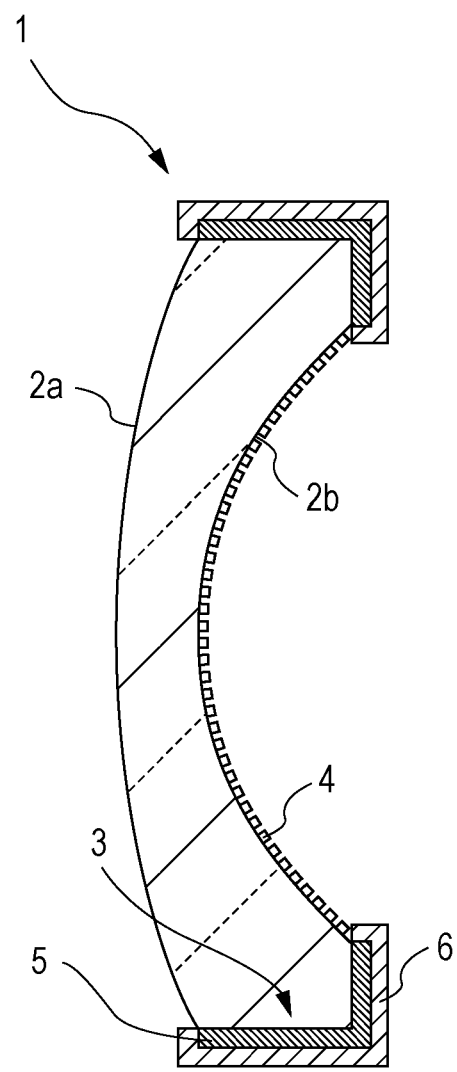
FIG. 1 is a sectional view of an optical element, including an optically ineffective area coated with an opaque coating, according to an embodiment of the present invention.

An opaque coating used herein is obtained by curing a base compound prepared by mixing an epoxy resin with an additive such as a black dye using an alicyclic acid anhydride serving as a curing agent for epoxy resins. The use of the alicyclic acid anhydride allows a cured product to have improved heat resistance and flexibility and therefore is effective in preventing a phenomenon, such as boundary separation, affecting the function and appearance of the opaque coating.

An optical element according to an embodiment of the present invention includes an optically effective area and an optically ineffective area partly or entirely coated with a coating opaque at wavelengths used. The opaque coating contains a cured product prepared from an epoxy resin and a curing agent containing an alicyclic acid anhydride.

In the optical element, the optically ineffective area is partly or entirely coated with the opaque coating, which is opaque at wavelengths used. The opaque coating contains the cured product, which is prepared from the epoxy resin and the curing agent containing the alicyclic acid anhydride. The alicyclic acid anhydride is used to cure the epoxy resin. The term "alicyclic acid anhydride" as used herein refers to a dicarboxylic anhydride which has a hydrocarbon ring structure other than an aromatic ring and which is represented by the following formula:

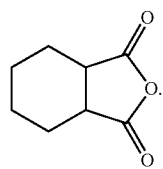

(1)

A cured product prepared by curing an antireflective paint containing an epoxy resin, a black dye, and the like using the alicyclic acid anhydride as a curing agent has been subjected to thermogravimetry-differential thermal analysis (TG-DTA). As a result, it has been verified that the change in weight of the cured product is small at temperatures where cured products prepared using conventional curing agents such as modified aromatic polyamines and polyamines are reduced in weight. This suggests that the cured product has excellent durability at elevated temperatures.

The cured product has been measured for glass transition temperature (Tg). This has resulted in that the cured product is lower in glass transition temperature than cured products prepared using conventional curing agents, which suggests that the flexibility of the cured product is maintained. Therefore, a phenomenon, such as boundary separation, caused by the reduction of the adhesion between the opaque coating and a substrate can be prevented.

The opaque coating contains the cured product prepared as described above and therefore is suitable for processes including heat treatment and steam treatment. In particular, the opaque coating is suitable for a process in which a sub-wavelength structure is formed in such a manner that a coating containing aluminum oxide or aluminum is fixed on an optically effective portion of an optical device and is then immersed in hot water.

This embodiment is described below in detail. In this embodiment, a material used to form the opaque coating is a base compound prepared by mixing the epoxy resin with an additive such as a black dye and the alicyclic acid anhydride is used as a curing agent. The opaque coating is formed in such a manner that a coating material containing the base compound and the alicyclic acid anhydride is applied to the optically effective area of the optical element by an arbitrary process and is then cured under predetermined conditions.

The base compound preferably has a composition of 10% to 20% of the epoxy resin, 25% to 35% of a light-absorbing material such as a black dye, and 15% to 25% of an auxiliary material such as filler on a weight basis, the remainder being an organic solvent.

Although a wide variety of materials can be used herein, the alicyclic acid anhydride is preferably a phthalic anhydride derivative such as methylhexahydrophthalic anhydride or hexahydrophthalic anhydride. The phthalic anhydride derivative, of which examples are usually solid at room temperature, is preferably liquid at room temperature because the phthalic anhydride derivative can be readily mixed with the base compound. An example of the phthalic anhydride derivative that is liquid at room temperature is methylhexahydrophthalic anhydride commercially available from New Japan Chemical Co., Ltd. under the trade name RIKACID MH-700.

The amount of the alicyclic acid anhydride mixed with the epoxy resin is preferably 75 to 100 parts and more preferably 80 to 90 parts by weight per 100 parts by weight of the epoxy resin.

In this embodiment, the concentration or viscosity of the base compound may be adjusted for the purpose of adjusting the thickness of the opaque coating or improving the handling of the base compound during coating. This can be achieved by adjusting the amount of the organic solvent or epoxy resin used.

In this embodiment, the coating material, which is used to form the opaque coating, may contain a curing accelerator. The opaque coating preferably contains at least one selected from the group consisting of tar, pitch, dye, pigment, mica particles, and silica particles.

In this embodiment, the optically ineffective area of the optical element may be surface-treated for the purpose of improving the fixation of the coating material. A process of applying the coating material to the optically ineffective area is not particularly limited and the coating material can be applied to the optically ineffective area by various processes such as spin coating, spray coating, and dip coating depending on the shape of the optical element or the position of the optically ineffective area.

A process of curing the coating material is not particularly limited and the coating material is preferably cured by a thermal process. In the case of using the thermal process, heating conditions are selected depending on the type of the curing agent, the type of the curing accelerator, and/or the heat resistance of a base member of the optical element. When the base compound and the curing agent are main components, the heating temperature of the coating material is preferably 100° C. to 250° C. and more preferably 120° C. to 220° C. and the heating time thereof is preferably 30 minutes to 20 hours and more preferably one hour to four hours.

In this embodiment, after the opaque coating is formed, another coating may be formed on the opaque coating for the purpose of increasing surface scratch resistance, smoothness, hydrophobicity, and the like. The optical element is a lens and therefore the optically ineffective area is located at a side end of the lens.

After the opaque coating is formed on the optically ineffective area of the optical element, a coating, such as an antireflection coating, having an optical function may be formed on the optically effective area by an arbitrary process. A sub-wavelength structure, containing aluminum or aluminum oxide, not greater than a wavelength used is preferably formed on at least one surface of the optically effective area. As used herein, "a sub-wavelength structure" is intended to mean a repetitive structure (periodic or otherwise) having pitch dimensions less than a wavelength (or range of wavelengths) of light being transmitted therethrough. Such a sub-wavelength structure can be advantageously used as an anti-reflective element that can suppress unwanted reflective losses and effectively increase the anti-reflective (optical transmission) properties of the optical element on which the structure is formed.

The sub-wavelength structure is suitable for use in a high-temperature process including heating in air or a high-humidity process including immersion in hot water. The sub-wavelength structure is preferably formed in such a manner that a coating containing aluminum or aluminum oxide is formed and is then immersed in hot water. The sub-wavelength structure is formed of crystals principally containing a hydroxide of aluminum or a hydrate of aluminum oxide. The crystals are preferably tabular crystals in which tabular structures are selectively arranged perpendicularly to the surface of a thin-film layer. The crystals are preferably boehmite crystals.

The following process is preferred: for example, a process in which a coating material containing aluminum or aluminum oxide is applied to the surface of the base member of the optical element and a coating containing aluminum or aluminum oxide is formed by heating this coating material and is then immersed in hot water. The formed coating is preferably made of aluminum or aluminum oxide. This coating material applied thereto is preferably heated at a temperature of 100° C. to 220° C. for five minutes to 24 hours. The formed coating is preferably immersed in hot water at a temperature of 60° C. to 100° C. for five minutes to 24 hours. In this process, an aluminum component contained in the formed coating is formed into the sub-wavelength structure by reaction. The sub-wavelength structure serves as an antireflection coating.

The present invention is remarkably effective in the case where the optical element is placed under relatively severe conditions such as high-temperature and high-humidity conditions for a long period of time. This does not limit uses of the opaque coating.

Another Embodiment

Figure 3:
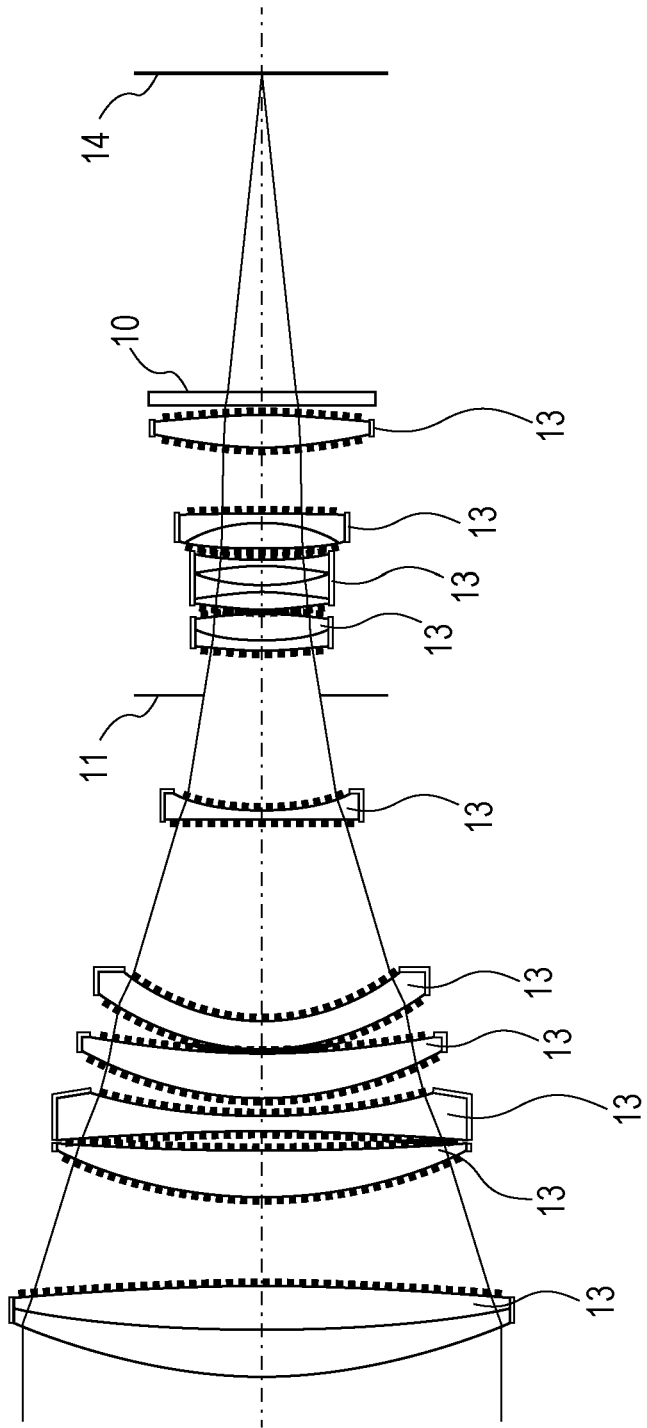
FIG. 3 is a sectional view of an imaging optical system according to an embodiment of the present invention.

Another embodiment of the present invention provides an imaging optical system including optical elements according to an embodiment of the present invention. FIG. 3 shows imaging lenses (herein corresponding to telephoto lenses) such as camera lenses in cross section.

With reference to FIG. 3, reference numeral 14 represents a film corresponding to an image plane or represents a solid-state image pickup device (photoelectric conversion device) such as a CCD (charge coupled device) or a CMOS (complementary metal oxide semiconductor) sensor. Reference numeral 11 represents an aperture, and reference numeral 13 represents a plurality of optical elements of various shapes used in the imaging optical system (e.g. an imaging lens for an imaging pickup apparatus). The imaging optical system focuses light from an object (not shown) through the optical elements 13 to form an image of the object at the image plane on the film or solid-state image pickup device represented by reference numeral 14. The optical elements 13 each include an optically ineffective area coated with an opaque coating containing a cured product prepared from an epoxy resin and a curing agent containing an alicyclic acid anhydride and an optically effective area coated with an antireflection coating. The antireflection coating is preferably formed in such a manner that a sub-wavelength structure which contains aluminum or aluminum oxide and which is not greater than a wavelength used is provided on at least one surface of at least one of the optical elements 13.

The opaque coating, which contains the cured product prepared from the epoxy resin and the curing agent containing the alicyclic acid anhydride, is not limited to this embodiment. The optically ineffective area may be partly or entirely coated with the opaque coating. Some of the optical elements 13 may include the opaque coatings.

EXAMPLES

The present invention is further described below in detail with reference to examples. The present invention is not limited to the examples.

Example 1

FIG. 1 is a sectional view of an optical element, including an optically ineffective area coated with an opaque coating, according to an embodiment of the present invention. With reference to FIG. 1, reference numeral 1 represents the optical element, reference numerals 2a and 2b represent optically effective areas, reference numeral 3 represents the optically ineffective area, and reference numeral 5 represents the opaque coating. The optical element 1 is shown in the form of a lens. The opaque coating 5 is disposed on the optically ineffective area 3. The thickness of the opaque coating 5 is shown in an enlarged scale in FIG. 1 for ease of illustration.

In this example, a coating material for forming the opaque coating 5 was prepared by mixing eight parts by weight of a base compound, prepared by mixing an epoxy resin with an additive such as a black dye, available from Canon Chemicals Inc. under the trade name GT-7A; 1.26 parts by weight of a bisphenol-A epoxy resin, used an additional additive, available from Japan Epoxy Resins Co., Ltd. under the trade name jER 828; 2.2 parts by weight of methylhexahydrophthalic anhydride commercially available from New Japan Chemical Co., Ltd. under the trade name RIKACID MH-700; and eight parts by weight of a toluene-based thinner used as a diluent.

Figure 2A:
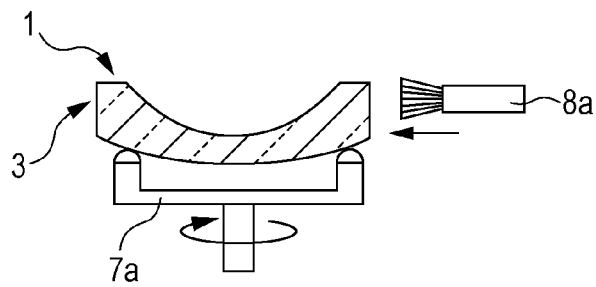
FIGS. 2A to 2E are illustrations showing exemplary steps of a method of manufacturing the optical element shown in FIG. 1.
Figure 2B:
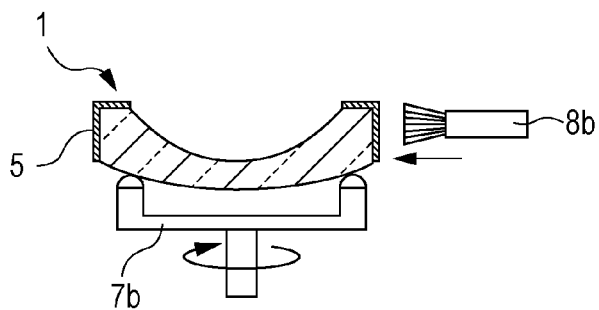

The optical element 1 was manufactured by a method shown in FIGS. 2A to 2E as described below. The coating material was applied to the optically ineffective area 3 as shown in FIG. 2A. In particular, the coating material was applied thereto with a brush 8a in such a manner that a lens was put on a rotary table 7a and the rotary table 7a was slowly rotated as shown in FIG. 2A. The coating material applied thereto was dried at room temperature for two hours and then at 210° C. for three hours, whereby the opaque coating 5 was formed. A coating material containing a phenol resin was applied to the opaque coating 5 with a brush 8b in such a manner that the lens having the opaque coating 5 was put on a rotary table 7b and the rotary table 7b was slowly rotated as shown in FIG. 2B. The phenol resin-containing coating material applied thereto was dried at room temperature for one hour and then at 150° C. for three hours, whereby a protective coating 6 was formed on the opaque coating 5.

Figure 2C:
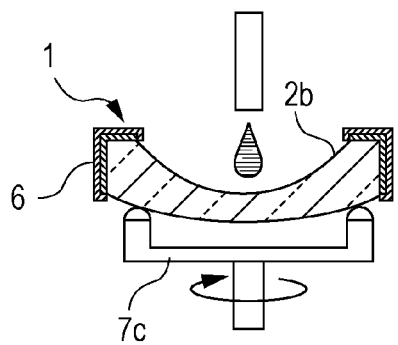

The optically effective area 2b was spin-coated with a coating material containing aluminum or aluminum oxide in such a manner that the lens having the opaque coating 5 and the protective coating 6 was put on a rotary table 7c, the rotary table 7c was rotated at 3,000 rpm for 30 seconds, and the aluminum or aluminum oxide-containing coating material was dripped on a region near the center of a concave surface of the optically effective area 2b as shown in FIG. 2C. The lens was heated at 210° C. for three hours.

Figure 2D:
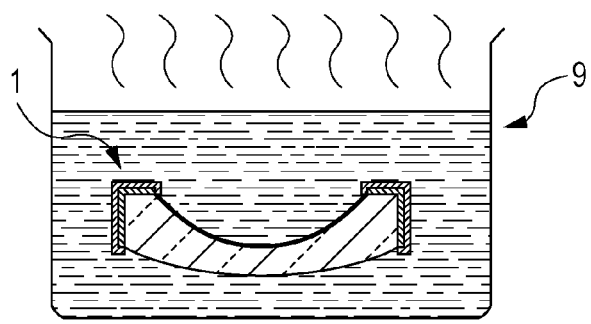
Figure 2E:
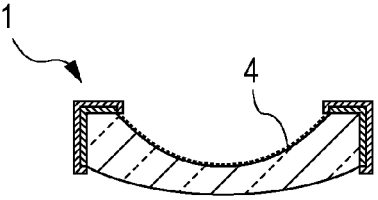

The heated lens was immersed in a hot-water treatment tank 9 maintained at a temperature of 65° C. to 85° C. for 30 minutes as shown in FIG. 2D, so that a sub-wavelength structure 4, containing aluminum or aluminum oxide, not greater than a wavelength used was formed on the optically effective area 2b, whereby the optical element 1 was obtained as shown in FIG. 2E.

The optical element 1 was subjected to a high-temperature, high-humidity reliability test at a temperature of up to 50° C. or higher and a humidity of 60% or more. The observation of the appearance of the resulting optical element 1 showed that the opaque coating 5 on the optically ineffective area 3 had no change as compared to the untested opaque coating 5, was good, and had no functional problem.

Example 2

An optical element including an optically effective area having a sub-wavelength structure disposed thereon and an optically ineffective area coated with an opaque coating was manufactured in substantially the same manner as that described in EXAMPLE 1 except that a coating material containing a phenol resin was not applied to the opaque coating and therefore a protective coating was not formed after the opaque coating was formed.

The optical element was subjected to substantially the same high-temperature, high-humidity reliability test as that described in EXAMPLE 1. The observation of the appearance of the resulting optical element showed that the opaque coating on the optically ineffective area had no change as compared to the untested opaque coating, was good, and had no functional problem.

Example 3

An optical element including an optically effective area having a sub-wavelength structure disposed thereon and an optically ineffective area coated with an opaque coating was manufactured in substantially the same manner as that described in EXAMPLE 1 except that a coating material containing a particulate component with a small particle size of 1 μm or less and a base compound prepared by mixing a commercially available black dye with an additive was used.

The optical element was subjected to substantially the same high-temperature, high-humidity reliability test as that described in EXAMPLE 1. The observation of the appearance of the resulting optical element showed that the opaque coating on the optically ineffective area had no change as compared to the untested opaque coating, was good, and had no functional problem.

Example 4

An optical element including an optically effective area having a sub-wavelength structure disposed thereon and an optically ineffective area coated with an opaque coating was manufactured in substantially the same manner as that described in EXAMPLE 1 except that 0.04 parts by weight of 2,4,6-tris(dimethylamino)methylphenol (DMP-30), which was used as a curing agent, was added to the coating material used to form the opaque coating 5 in EXAMPLE 1.

The optical element was subjected to substantially the same high-temperature, high-humidity reliability test as that described in EXAMPLE 1. The observation of the appearance of the resulting optical element showed that the opaque coating on the optically ineffective area had no change as compared to the untested opaque coating, was good, and had no functional problem.

Example 5

An optical element including an optically effective area having a sub-wavelength structure disposed thereon and an optically ineffective area coated with an opaque coating was manufactured in substantially the same manner as that described in EXAMPLE 4 except that the opaque coating was formed at a heating temperature of 150° C.

The optical element was subjected to substantially the same high-temperature, high-humidity reliability test as that described in EXAMPLE 1. The observation of the appearance of the resulting optical element showed that the opaque coating on the optically ineffective area had no change as compared to the untested opaque coating, was good, and had no functional problem.

Comparative Example 1

An optical element including an optically effective area having a sub-wavelength structure disposed thereon and an optically ineffective area coated with an opaque coating was manufactured in substantially the same manner as that described in EXAMPLE 1 except that the opaque coating was formed as follows: a coating material used to form the opaque coating was prepared by mixing eight parts by weight of a base compound prepared by mixing the same black dye as that described in EXAMPLE 1 with an additive, one part by weight a curing agent principally containing a commercially available modified aromatic polyamine, and eight parts by weight of a toluene-based thinner used as a diluent; was applied to the optically ineffective area in substantially the same manner as that described in EXAMPLE 1; was dried at room temperature for two hours; and was then heated at 90° C. for three hours.

The optical element was subjected to substantially the same high-temperature, high-humidity reliability test as that described in EXAMPLE 1. The observation of the appearance of the resulting optical element showed that the opaque coating on the optically ineffective area was whitened as compared the untested opaque coating.

An optical element according to an embodiment of the present invention includes an opaque coating and an optically ineffective area partly or entirely coated with the opaque coating which contains a cured product having improved heat resistance and flexibility and which is opaque at wavelengths used. Therefore, the optical element can be used as a lens and can be used for optical systems and optical apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-008494 filed Jan. 18, 2010, which is hereby incorporated by reference herein in its entirety.

What is claimed is:

1. An optical element, comprising:
    an optically effective area coated with a coating having an optical function; and
    an optically ineffective area partly or entirely coated with a opaque coating,
    wherein the opaque coating contains a cured product prepared from an epoxy resin and a curing agent containing an alicyclic acid anhydride,
    wherein the optically effective area has a sub-wavelength structure which is disposed on at least one surface of the optically effective area, and
    wherein the sub-wavelength structure contains aluminum or aluminum oxide.

2. The optical element according to claim 1, wherein the alicyclic acid anhydride is methylhexahydrophthalic anhydride or hexahydrophthalic anhydride.

3. The optical element according to claim 1, wherein the opaque coating contains at least one selected from the group consisting of tar, pitch, dye, pigment, mica particles, and silica particles.

4. The optical element according to claim 1, wherein the optically effective area has a sub-wavelength structure which is disposed on at least one surface thereof,
    wherein the sub-wavelength structure contains aluminum or aluminum oxide, and
    wherein the sub-wavelength structure includes a repetitive structure having pitch dimensions less than a wavelength used.

5. The optical element according to claim 4, wherein the sub-wavelength structure is formed of crystals principally containing a hydroxide of aluminum or a hydrate of aluminum oxide.

6. The optical element according to claim 5, wherein the sub-wavelength structure increases the anti-reflective properties of the at least one surface on which the sub-wavelength structure is disposed.

7. The optical element according to claim 1, wherein the optical element is a lens and the optically ineffective area is located at the edge of the lens.

8. An imaging optical system focusing light from an object to form an image of the object, comprising the optical element according to claim 1.

9. The optical element according to claim 1, wherein the sub-wavelength structure is formed of crystals principally containing a hydroxide of aluminum or a hydrate of aluminum oxide.

10. The optical element according to claim 1, wherein the sub-wavelength structure is formed of crystals principally containing boehmite crystals.

11. The optical element according to claim 1, wherein the sub-wavelength structure increases anti-reflective properties of the at least one surface on which the sub-wavelength structure is disposed.

12. The optical element according to claim 1, wherein the optically ineffective area is located at the edge of the lens.

13. The optical element according to claim 1, wherein the optically ineffective area is located at the edge of the optical element, the sub-wavelength structure containing aluminum or aluminum oxide is manufactured by processes of applying a coating material containing aluminum or aluminum oxide onto the optical element coated with the opaque coating, forming the coating material by heating the coating material, and immersing the coating material or the opaque coating in hot water at a temperature of 60° C. to 100° C.

* * * * *